UNITED STATES PATENT OFFICE.

EMIL JOHNSON AND JOHAN FRYKBERG, OF MANISTEE, MICHIGAN.

ART OF COMPOUNDING AND MAKING GRINDING-WHEELS.

SPECIFICATION forming part of Letters Patent No. 495,251, dated April 11, 1893.

Application filed September 12, 1892. Serial No. 445,620. (No specimens.)

*To all whom it may concern:*

Be it known that we, EMIL JOHNSON and JOHAN FRYKBERG, citizens of the United States, residing at Manistee, in the county of Manistee and State of Michigan, have invented certain new and useful Improvements in the Art of Compounding and Making Grinding-Wheels; and we do declare the following to be a full, clear, and exact description of the invention, such as will enable others skilled in the art to which it appertains to make and use the same.

Our invention relates to an improvement in the art of compounding and making grinding wheels, as hereinafter specified.

In making the wheel we use the following named ingredients, in substantially the proportions stated, to wit:—Emery, twelve pounds; corundum, twelve pounds; sand, three pounds; shellac, two pounds, and plaster of paris, one and a half pounds. These ingredients are in the usual pulverulent condition before mixing. To compound them we mix them thoroughly by any proper means, and then place the mixture in vessels and subject the composition to a heat sufficient to render the mass soft, pliable and plastic. When this prepared mass is in the condition stated, the compound is taken from the vessel and allowed to cool gradually and naturally. The material thus prepared, is then broken up and pulverized, and the pulverulent assorted by sifting. The pulverulent material is then placed in metal molds and heated again until the mixture becomes melted and plastic, and then is subjected to the formative process by pressure in the usual manner. The formed wheels are then allowed to cool.

We have ascertained by actual experience that grinding-wheels made by the method described, do not burn the metal of the material, or article, being ground or polished; and that the wheels also, last as long or longer than wheels made by the usual methods heretofore practiced. The shellac acts as a binder and the sand and the plaster of paris prevent the wheels from being too hard.

Having thus described our invention, what we claim, and desire to secure by Letters Patent, is—

The improvement in the art of making emery-corundum grinding wheels, consisting in mixing the ingredients, then subjecting the mixed materials to heat sufficient to render them pliable and plastic, then permitting the materials to cool, then pulverizing the material, then heating the pulverized material until melted, then placing the plastic material in molds and subjecting it to pressure.

In testimony whereof we affix our signatures in presence of two witnesses.

EMIL JOHNSON.
JOHAN FRYKBERG.

Witnesses:
J. H. GRANT,
W. J. GREGORY.